(12) United States Patent
Shimazawa et al.

(10) Patent No.: US 11,315,597 B1
(45) Date of Patent: Apr. 26, 2022

(54) NEAR-FIELD TRANSDUCER WITH SEPARATED BOTTOM AU LAYER

(71) Applicant: Headway Technologies, Inc., Milpitas, CA (US)

(72) Inventors: Koji Shimazawa, Cupertino, CA (US); Weihao Xu, San Jose, CA (US); Ken Fujii, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/156,920

(22) Filed: Jan. 25, 2021

(51) Int. Cl.
| | |
|---|---|
| G11B 11/105 | (2006.01) |
| G11B 13/08 | (2006.01) |
| G11B 5/012 | (2006.01) |
| G11B 5/00 | (2006.01) |
| G11B 5/60 | (2006.01) |
| G11B 5/48 | (2006.01) |

(52) U.S. Cl.
CPC .............. *G11B 13/08* (2013.01); *G11B 5/012* (2013.01); *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,000,178 B2 | 8/2011 | Shimazawa et al. | |
| 8,059,496 B1 * | 11/2011 | Zhou | G11B 5/6088 369/13.33 |
| 8,488,419 B1 * | 7/2013 | Jin | G11B 5/6088 369/13.32 |
| 8,804,468 B2 | 8/2014 | Zhao et al. | |
| 8,947,986 B1 * | 2/2015 | Araki | G11B 5/314 369/13.33 |
| 9,019,803 B1 * | 4/2015 | Jin | G11B 13/08 369/13.33 |
| 9,064,515 B2 | 6/2015 | Zhao et al. | |
| 9,099,112 B1 | 8/2015 | Balamane et al. | |
| 9,129,620 B2 | 9/2015 | Cheng et al. | |

(Continued)

OTHER PUBLICATIONS

U.S. Office Action, U.S. Appl. No. 15/011,892, Applicant: Staffaroni et al., dated Dec. 14, 2016, 12 pages.

(Continued)

*Primary Examiner* — Tan X Dinh
(74) *Attorney, Agent, or Firm* — Saile Ackerman LLC; Stephen B. Ackerman

(57) ABSTRACT

A plasmon generator (PG) is formed between a waveguide and main pole, and has a front portion (Au/Rh bilayer) wherein the upper Rh layer has a peg shape at an air bearing surface (ABS), and a tapered backside that is separated from a PG back portion by a dielectric spacer. The lower Au layer has a front side recessed from the ABS and curved sides self-aligned with the Rh layer sides. A key feature is that the back section of lower Au layer curved side forms a smaller angle with a plane aligned orthogonal to the ABS than a front section thereof thereby selectively enabling a deformation of the back end of the Au layer during a heat treatment to >300° C. at the wafer level. Accordingly, the front end of the lower Au layer is densified and provides an improved heat sink to improve reliability and area density capability (ADC).

13 Claims, 12 Drawing Sheets

(56) References Cited

U.S. PATENT DOCUMENTS

| | | |
|---|---|---|
| 9,424,866 B1 | 8/2016 | Cao |
| 9,466,320 B1 | 10/2016 | Staffaroni et al. |
| 9,472,220 B1 | 10/2016 | Burgos |
| 9,530,445 B1 | 12/2016 | Grobis |
| 9,786,314 B1 | 10/2017 | Peng |
| 9,852,752 B1* | 12/2017 | Chou .................. G11B 5/6082 369/13.33 |
| 10,043,542 B2 | 8/2018 | Shimazawa et al. |
| 10,249,333 B2* | 4/2019 | Maletzky ............. G11B 5/3133 369/13.33 |
| 10,262,683 B2* | 4/2019 | Staffaroni ........... G11B 5/6088 369/13.33 |
| 10,490,215 B1 | 11/2019 | Chen et al. |
| 10,586,560 B1* | 3/2020 | Wang .................... G11B 5/314 369/13.33 |
| 10,872,628 B1 | 12/2020 | Shimazawa et al. |
| 11,043,240 B1* | 6/2021 | Shimazawa .......... G11B 5/1278 369/13.33 |
| 2011/0205863 A1 | 8/2011 | Zhao et al. |
| 2013/0142020 A1 | 6/2013 | Rawat |
| 2016/0379677 A1 | 12/2016 | Van Orden |
| 2017/0186451 A1 | 6/2017 | Bian et al. |
| 2017/0221505 A1 | 8/2017 | Staffaroni |
| 2019/0198053 A1 | 6/2019 | Krichevsky et al. |

OTHER PUBLICATIONS

U.S. Office Action, U.S. Appl. No. 15/011,892, Applicant: Staffaroni et al., dated Mar. 29, 2017, 10 pages.

U.S. Office Action, U.S. Appl. No. 15/011,892, Applicant: Staffaroni et al., dated Aug. 7, 2017, 10 pages.

U.S. Office Action, U.S. Appl. No. 15/011,892, Applicant: Staffaroni et al., dated Jan. 5, 2018, 7 pages.

U.S. Office Action, U.S. Appl. No. 15/011,892, Applicant: Staffaroni et al., dated Aug. 27, 2018, 6 pages.

U.S. Notice of Allowance, U.S. Appl. No. 15/011,892, Applicant: Staffaroni et al., dated Dec. 21, 2018, 5 pages.

Barnes, W., et al., Surface plasmon subwavelength optics, Nature, vol. 424, pp. 824-830, Aug. 14, 2003, https://doi.org/10.1038/nature01937.

Challener, W. A., et al. Heat-assisted magnetic recording by a near-field transducer with efficient optical energy transfer, Nature Photon, vol. 3, pp. 220-224, Apr. 2009, https://doi.org/10.1038/nphoton.2009.26.

Wang Xiaobin, et al., HAMR Recording Limitations and Extendibilty, IEEE Transactions on Magnetics, vol. 49, No. 2, Feb. 2013, pp. 686-692.

Cechal Jan, et al., Detachment Limited Kinetics of Gold Diffusion through Ultrathin Oxide Layers, J. Phys. Chem. C 2014, pp. 17549-17555, Publication Date: Jul. 10, 2014, https://doi.org/10.1021/jp5031703.

U.S. Notice of Allowance, U.S. Appl. No. 16/800,049, Applicant: Shimazawa et al., dated Aug. 24, 2020, 14 pages.

U.S. Notice of Allowance, U.S. Appl. No. 16/800,049, Applicant: Shimazawa et al., dated Jul. 1, 2020, 8 pages.

* cited by examiner

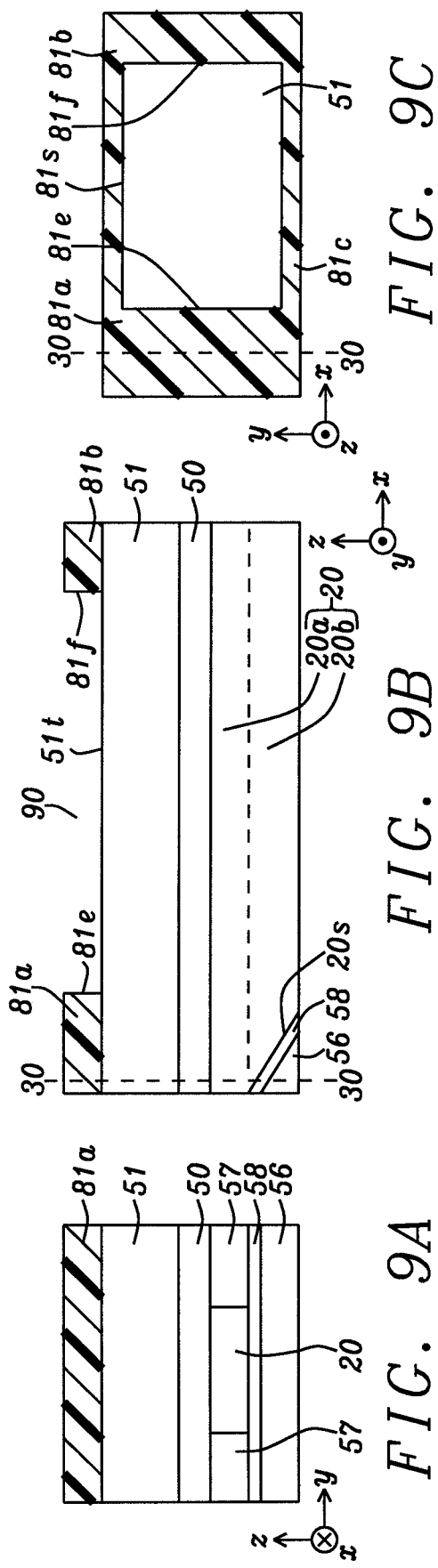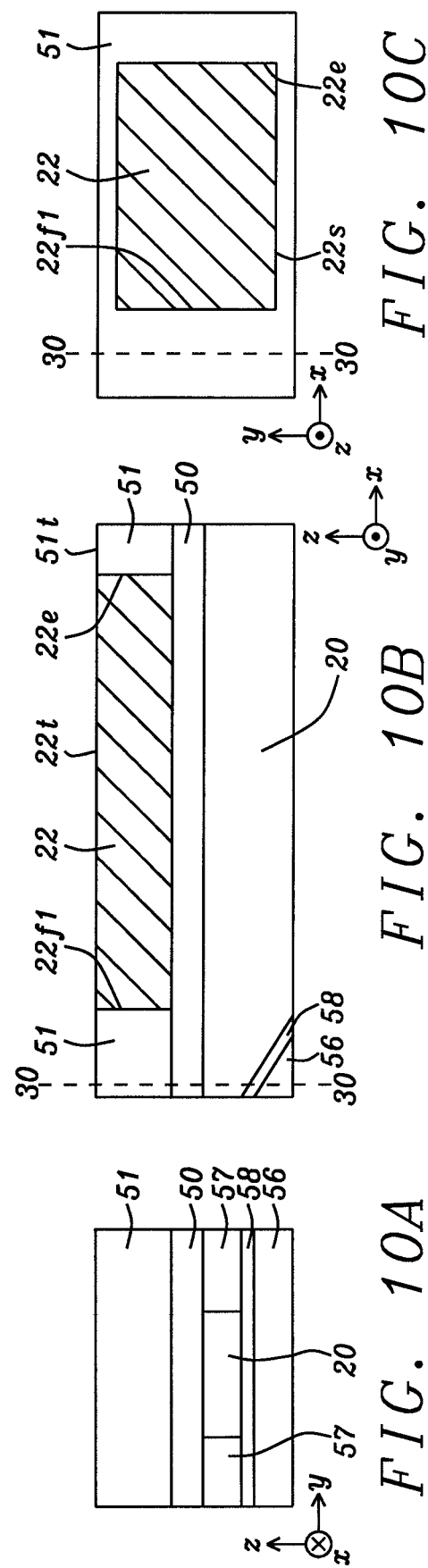

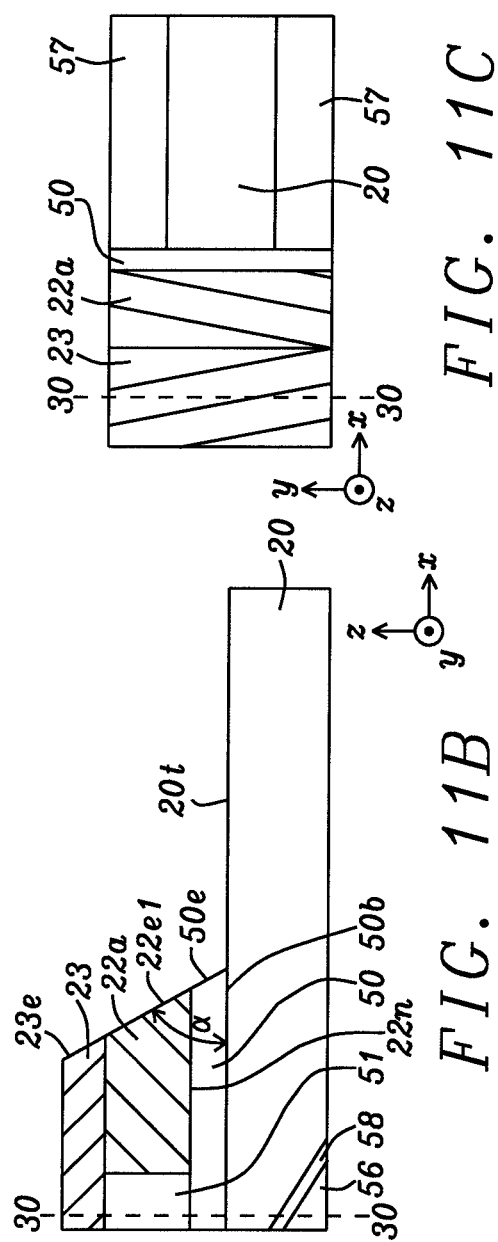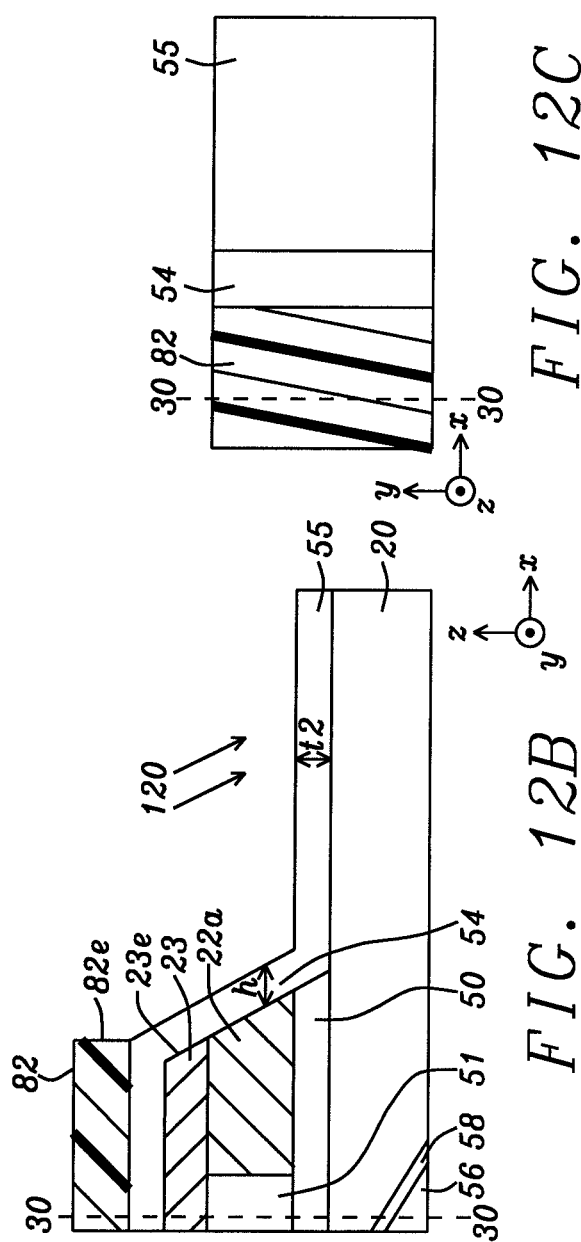

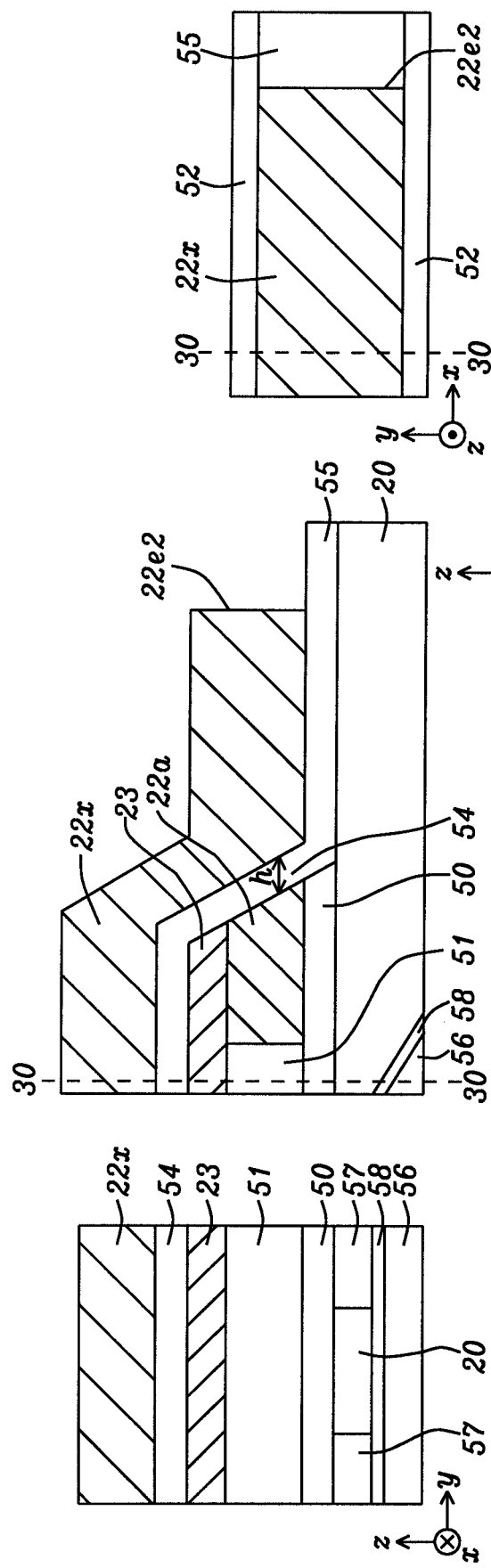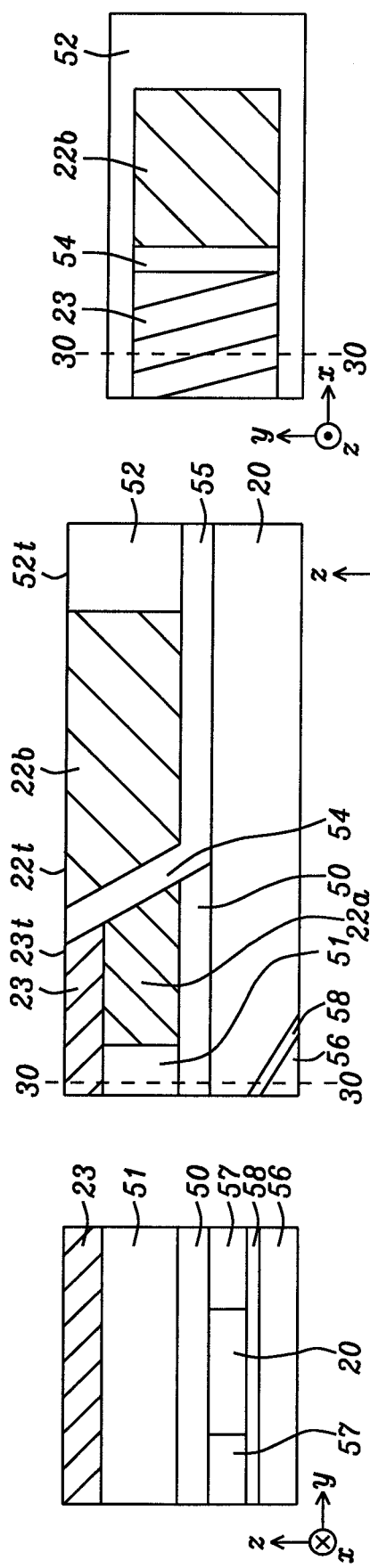

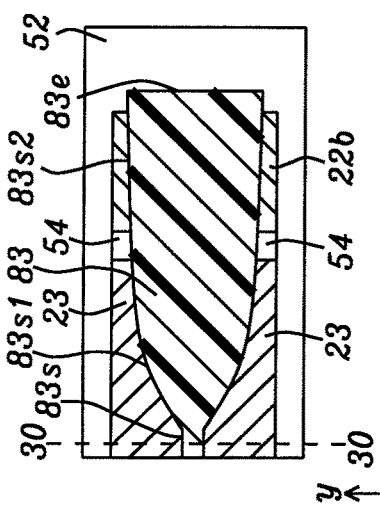 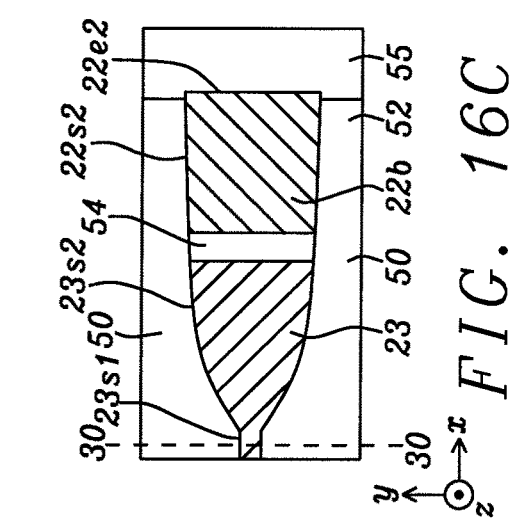
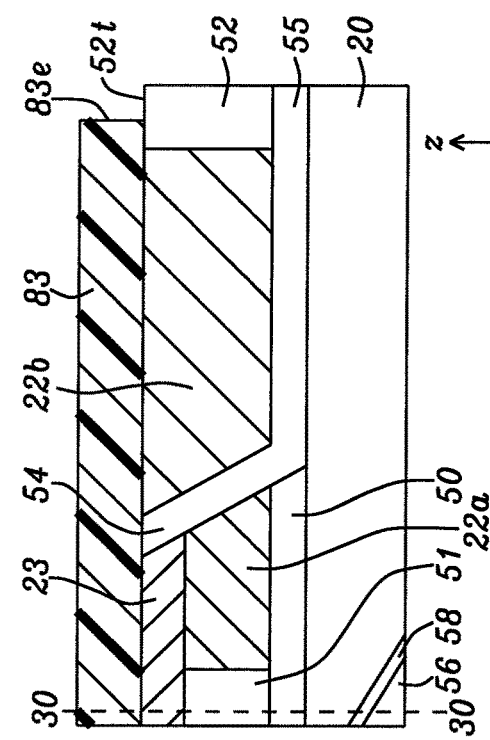 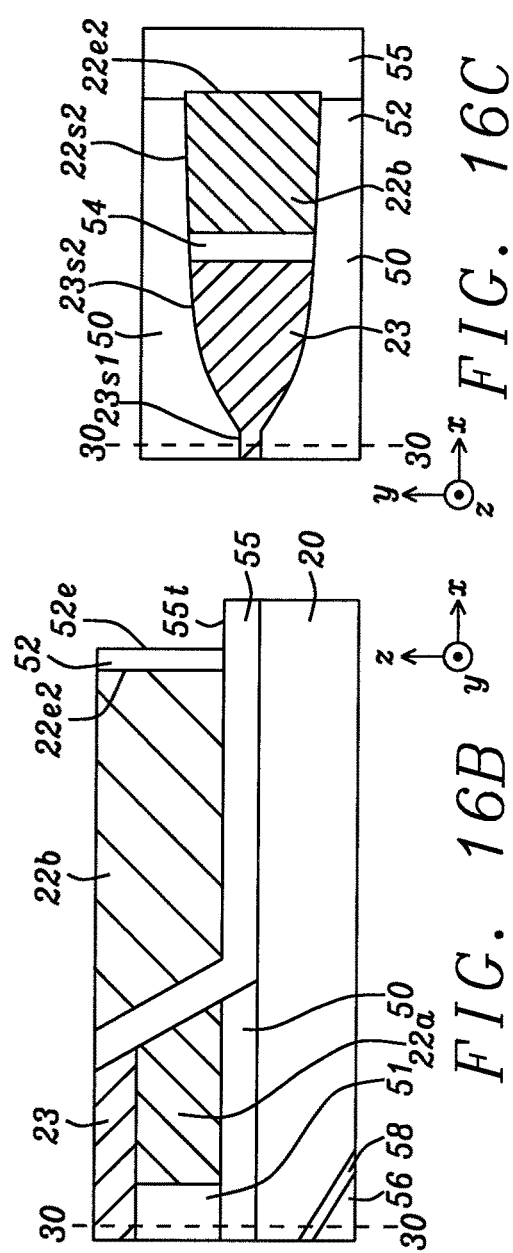
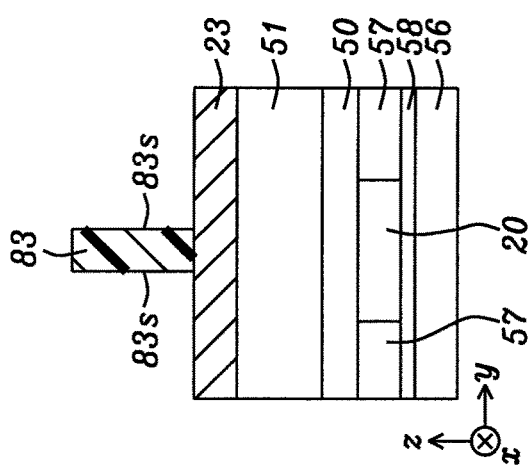
FIG. 15A  FIG. 15B  FIG. 15C
FIG. 16A  FIG. 16B  FIG. 16C

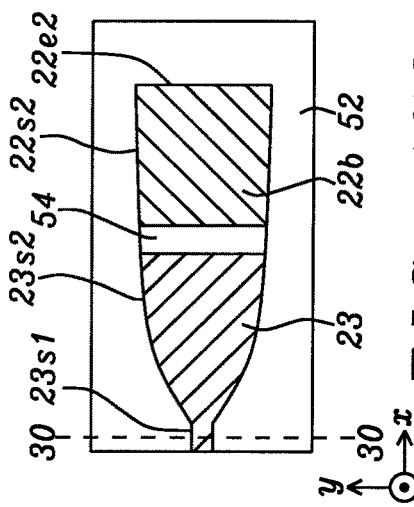
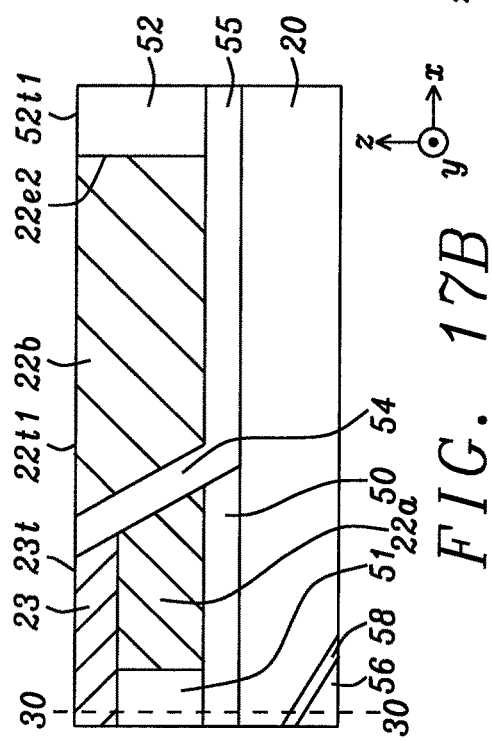
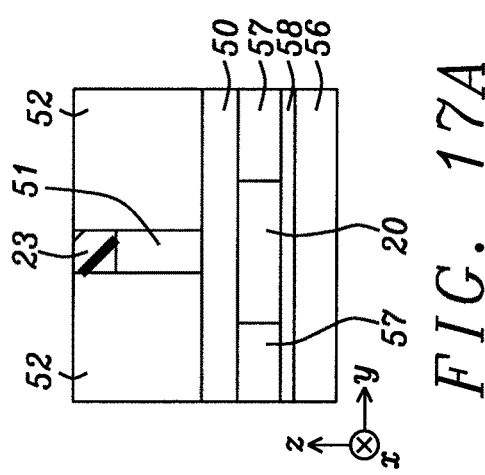
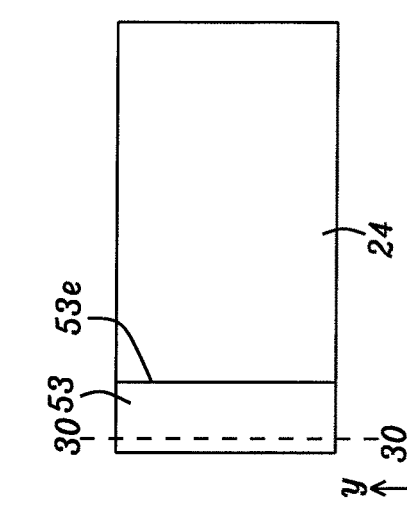
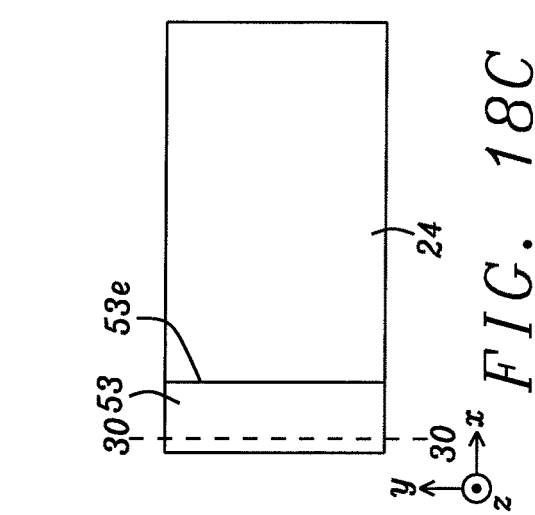
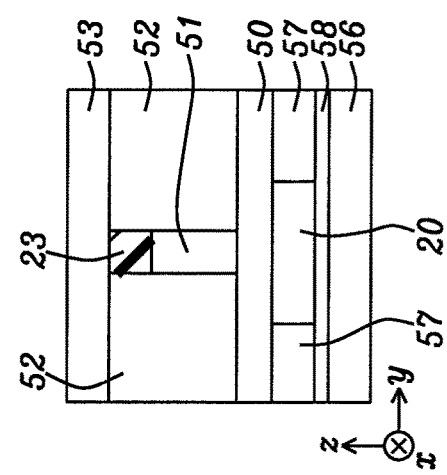

NEAR-FIELD TRANSDUCER WITH SEPARATED BOTTOM AU LAYER

RELATED PATENT APPLICATIONS

This application is related to the following: U.S. Pat. No. 10,262,683, and Ser. No. 16/800,049, filing date Feb. 25, 2020; assigned to a common assignee and herein incorporated by reference in their entirety.

TECHNICAL FIELD

The present disclosure relates to a thermally assisted magnetic recording (TAMR) device, and in particular to a near-field transducer (NFT) also known as a plasmon generator (PG) wherein a front portion is a bilayer with a Rh upper layer having a front side at the air bearing surface (ABS) and a Au bottom layer with a front side recessed from the ABS, and where a PG back portion preferably made of Au is separated from the PG front portion by a dielectric layer sloped at an angle of 45±15 degrees to reduce temperature rise, and the bottom Au layer in the front PG portion has a front edge angle greater than a rear edge angle so that a heat treatment during the fabrication process preferentially deforms a rear side of the bottom Au layer thereby minimizing Au recession at the front edge and optimizing area density capability (ADC).

BACKGROUND

To further increase the magnetic recording density of hard disk drive (HDD) systems, there is an increasing demand to improve the performance of thin film magnetic heads. A perpendicular magnetic recording (PMR) head that combines a single pole writer with a tunneling magnetoresistive (TMR) reader provides a high write field and large read-back signal to provide enhanced ADC. However, increasing the magnetic recording areal density requires smaller grain sizes in the magnetic recording media, which in turn reduces storage lifetime. In order to maintain durable storage lifetime, media thermal stability has to be increased. Consequently, the magnetic field generated by the writer's main pole as well as the current from the coil around the main pole may not be strong enough to switch the magnetic recording bits for data recording.

To solve this magnetic recording dilemma, TAMR was introduced. TAMR involves raising the temperature of a small region of the magnetic medium to near its Curie temperature where its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. The near-field light is generated from plasmons excited by irradiation with light through a metal layer. Light typically originates from a laser diode mounted on the backside of a slider and may be in a transverse electric (TE) or transverse magnetic (TM) mode. A beam is directed through a dielectric waveguide to a metal layer that is often called a peg because of a metallic nanostructure. The peg is also known as a plasmon generator (PG) or NFT, and generates near-field light efficiently by exciting surface plasmon (SP) or surface wave of free electrons bound at the metal-dielectric interface. Peg structure and geometry are engineered to enable efficient energy transfer from the waveguide to peg, to excite local surface plasmon resonance, and to utilize a so-called lightning rod effect to further improve field confinement. Note that peg down-track and cross-track dimensions at the ABS largely dictate optical power intensity on the magnetic recording layer.

U.S. Pat. No. 8,000,178 discloses a TAMR device where there is surface plasmon coupling between a TaOx waveguide and PG made of Au. This design has a significant challenge in terms of reliability since Au has a well known softening temperature of about 100° C., which is exceeded in the PG during a write operation. Generally, Au films have a density only about 90% in the bulk state, and when the softening temperature is exceeded, vacancies are discharged to the outside thereby shrinking the film. Accordingly, the front of the PG proximate to the ABS has a recession and the resulting void greatly degrades recording characteristics. For example, a gold PG with 95% density and a length (height orthogonal to ABS) of 1000 nm will form a 50 nm recession because of the vacancy discharge. However, it is known that a 5 nm recession will greatly reduce ADC performance.

In related U.S. Pat. No. 10,262,863, a self-aligned Au—Rh PG is disclosed to realize acceptable optical properties and reliability. In the design, Pt group elements such as Pt, Rh, and Ir are selected as PG materials for achieving both optical properties and robustness. PG materials not only need high surface plasmon (SP) efficiency but must also be reliable under high temperature irradiation during a TAMR writing process. Rh is particularly preferred in terms of good optical properties due to the large availability of free electrons and low optical absorption. However, during high temperature writing operations, the bottom Au layer in contact with Rh is subject to great thermal stress, which causes similar shrinking/recession problems described for the previous reference. Furthermore, Rh is susceptible to oxidation that leads to a degradation in plasmon efficiency and an undesirable increase in PG temperature. Thus, ADC performance for a Au—Rh bilayer PG is not as good as a gold peg, which narrows the extendibility of TAMR technology.

U.S. Pat. No. 10,043,542 describes a PG wherein Au in a front PG portion is separated from Au in a back PG portion using an Ir, Co, or Rh separation layer. Since the Au PG proximate to the ABS is isolated, Au volume is minimized and the amount of recess from vacancy discharge is reduced for better reliability. However near-field light spreads in the metal separation layer to give deteriorated ADC. Although replacing the metal separation layer with a dielectric material eliminates ADC loss, there is difficulty in dissipating heat in the Au PG tip. As a result, there is an extreme PG temperature rise that causes Au in the front PG portion to diffuse through the dielectric layer and into the PG back portion.

An improved TAMR NFT that exhibits both thermal stability (reliability) and ADC performance enhancement is required for a successful commercial product. The new NFT structure must substantially limit PG recession and thermal degradation of TAMR performance while allowing for efficient energy transfer through the PG so that acceptable ADC performance and reliability are achieved simultaneously.

SUMMARY

One objective of the present disclosure is to provide a PG in a TAMR device where temperature rise is minimized even when a dielectric separation layer is used between PG front and back portions thereby improving reliability.

A second objective of the present disclosure is to provide a TAMR device according to the first objective that also substantially reduces PG recession at the ABS caused by heating thereby maintaining ADC performance.

A third objective of the present disclosure is to provide a method of forming the PG according to the first and second objectives and where the TAMR device is fabricated using existing materials and processes.

These objectives are realized according to a first embodiment of the present disclosure wherein a write head in a combined read-write head has a PG formed at the ABS and between a main pole (MP) and a waveguide. The PG has a front portion that is a bilayer where the upper layer that is preferably Rh or the like has a front side at the ABS while the front side of the lower layer that is preferably Au is recessed from the ABS. The PG front portion has a tapered backside, and the upper Rh layer bottom surface has a backend at a first height (h1) from the ABS while the backside of the lower Au layer is at a height greater than h1. The sloped backside of the PG front portion forms an angle α of 45±15 degrees with respect to the PG front portion bottom surface, and is important for efficient transfer of plasmon energy from the PG back portion to PG front portion. The upper Rh layer has a front portion with a rectangular shaped front side, and two sides that are equidistant from a center plane, and from a top-down view has a rod-like shape (peg) up to a second height (h2) where h2<h1. Between h2 and the Rh layer tapered backside, the curved sides of the Rh layer are separated with increasing width with increasing height from the ABS. The PG back portion has a sloped front side essentially parallel to the PG front portion backside, and is separated therefrom by a dielectric separation (DS) layer made of AlOx or SiOx and having a height of 10 nm to 30 nm. From a top-down view, the PG back portion has two curved sides separated by increasing distance in a cross-track direction with increasing distance from the DS layer, and terminating at a backside that is parallel to the ABS. The PG back portion is preferably made of Au or an alloy thereof. The aforementioned features of the PG and DS layer, as well as the surrounding dielectric layers described below are largely responsible for minimizing PG temperature rise and recession while maximizing ADC performance.

Preferably, the top surfaces of the PG front and back portions are coplanar. However, the PG front portion may have a lesser thickness in a down-track direction than that of the PG back portion. Typically, a first dielectric layer in front of the DS layer and having a thickness t1 separates the PG front portion from the waveguide while a second dielectric layer behind the DS layer has a thickness t2 between the PG back portion and waveguide (WG) where t1>t2. A third dielectric layer that is a peg-pole spacer (PPS) between the MP and PG front portion has a front side at the ABS and extends to a height PPSh where PPSh<h1. The PPS backside adjoins a front side of a diffusion barrier that extends over the DS layer and PG back portion. The diffusion barrier is typically Ru, Rh, or Ir and prevents inter-diffusion between the PG and MP. In some embodiments, a heat sink that is Ru, Rh, Ir, Au, or Cu is formed between the diffusion barrier and MP.

The WG is a high index dielectric material such as TaOx and has an upper WG portion with a front side at the ABS. However, a lower WG portion has a tapered front side that is separated from the ABS by a low index fourth dielectric layer that serves as a blocker to suppress waveguide modes in the lower WG portion. The blocker prevents uncoupled waveguide light in the lower WG portion from reaching the magnetic medium and thereby prevents degraded thermal confinement of the heating spot on the media. First through third dielectric layers mentioned previously are also made of a low index dielectric material such as SiOx.

The present disclosure also encompasses a method of fabricating a TAMR head as described in the aforementioned embodiment. A series of steps are described with respect to an ABS view, a down-track cross-sectional view at a center plane that bisects the PG, and from a top-down view. A key step during the fabrication process is a heat treatment of 300° C. or more to shrink the backend of the lower Au layer in the PG front portion to form a rounded backside proximate to the DS layer. As a result, vacancies and voids are effectively avoided in a front portion where the densified lower Au layer provides maximum ADC performance.

BRIEF DESCRIPTION OF THE DRAWINGS

FIGS. 9A-18A depict ABS views of various steps during a fabrication process to form the TAMR head in FIG. 5A according to an embodiment of the present disclosure.

FIGS. 9B-18B depict down-track cross-sectional views of various steps during the fabrication process to form the TAMR head in FIG. 5B according to an embodiment of the present disclosure.

FIGS. 9C-18C depict top-down views of various steps during the fabrication process to form the TAMR head in FIGS. 5A-5B according to an embodiment of the present disclosure.

DETAILED DESCRIPTION

The present disclosure is a TAMR device wherein a PG front portion has an upper Rh layer and a lower Au layer, and where PG temperature rise is minimized for improved reliability, and a heat treatment is applied to the PG at the wafer level to shrink a back end of the lower Au layer and thereby densify a front end of the said layer to ensure enhanced ADC performance. In all drawings, the y-axis is the cross-track (width) direction, the z-axis is the down-track (thickness) direction, and the x-axis is a direction orthogonal to the ABS (height dimension) and towards a back end of the device. A top surface indicates a side of a layer that faces away from a substrate while a front end or front side relates to a surface of a layer at or facing the ABS. A backside of a layer faces away from the ABS. A front end of a layer is a portion thereof proximate to the front side while a back end is a portion of a layer that is proximate to the backside of said layer. A "high index" material is defined as a material having a refractive index greater than 2.0 while a "low index" relates to a refractive index less than about 1.6. The peg refers to a rod-like portion of the PG front portion that is proximate to the ABS, and has a smaller width than the remainder of the PG.

Figure 1:
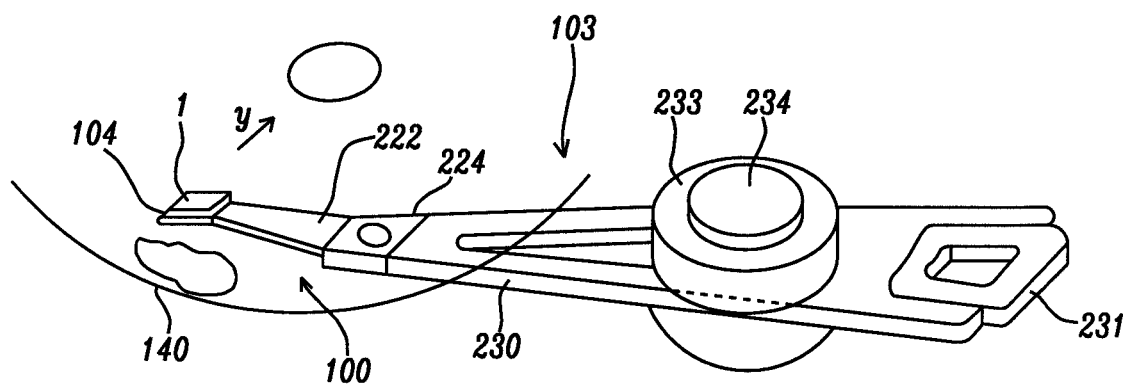
FIG. 1 is a perspective view of a head arm assembly of the present disclosure.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
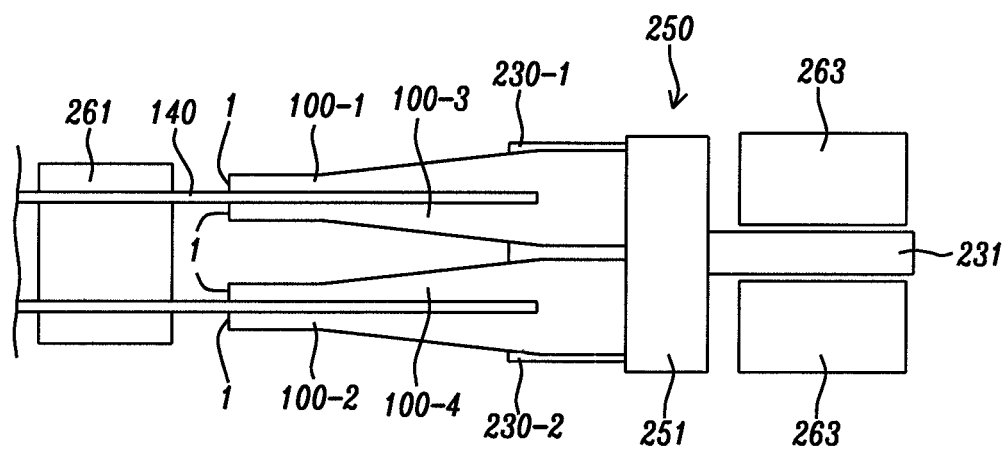
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a plurality of HGAs (HGA 100-1 and HGA 100-2 are at outer positions while HGA 100-3 and HGA 100-4 are at inner positions in the illustration) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
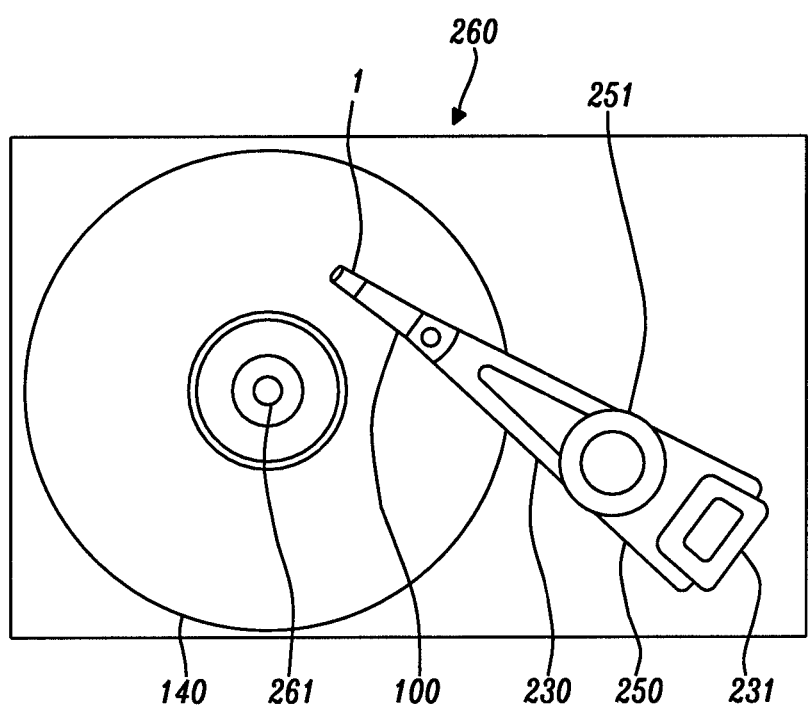
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
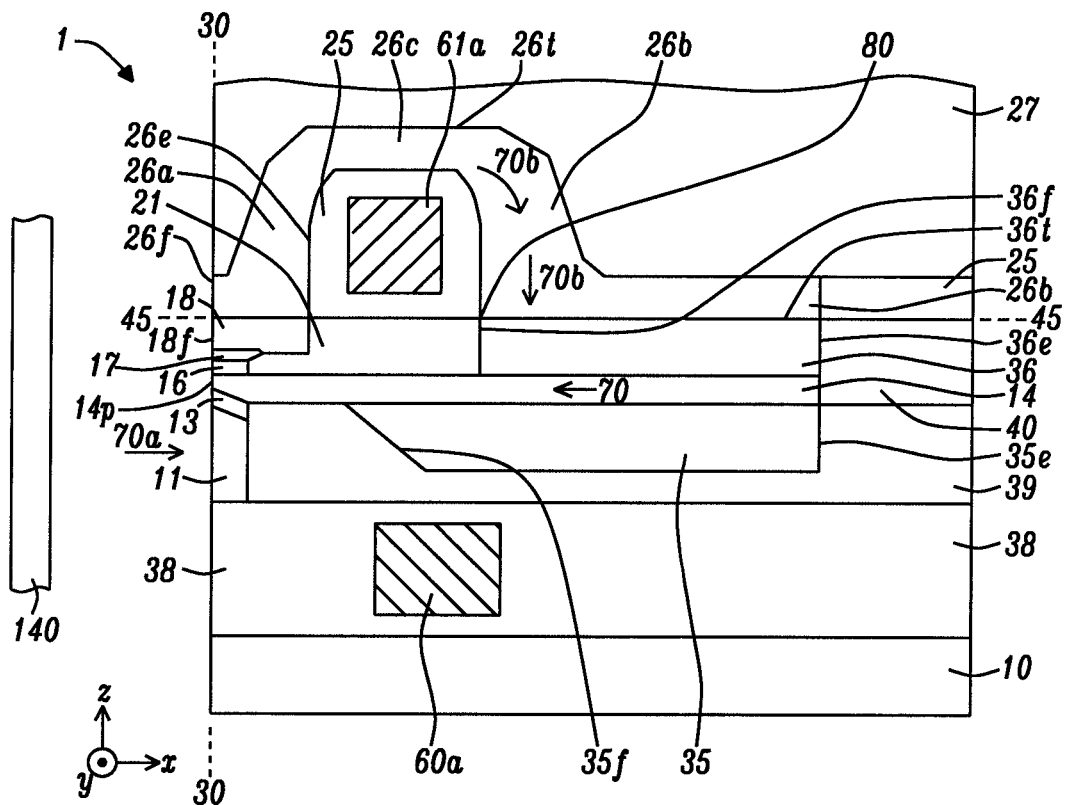
FIG. 4 is a down-track cross-sectional view of a write head portion of a combined read-write head according to an embodiment of the present disclosure.

Referring to FIG. 4, magnetic recording head 1 comprises a combined read-write head. However, only the write head portion is shown. The down-track cross-sectional view is taken along a center plane (44-44 in FIG. 5A) formed orthogonal to the ABS 30-30, and that bisects the main pole layer (MP) 14. The combined read-write head is formed on a substrate (not shown) that may be comprised of AlTiC (alumina+TiC). The substrate is typically part of a slider formed in an array of sliders on a wafer. After the combined read-write head is fabricated, the wafer is sliced to form rows of sliders. Each row is typically lapped to afford an ABS before dicing to fabricate individual sliders that are used in a magnetic recording device.

The present disclosure anticipates that various configurations of a write head may be employed. In the exemplary embodiment, magnetic flux 70 in MP 14 is generated with flowing a write current called $I_W$ (not shown) through a bucking coil (BC) comprising a front portion 60a and a driving coil (DC) comprising front portion 61a that are below and above the MP layer, respectively, and where center portions of the BC and DC are connected by an interconnect (not shown). Magnetic flux (write field) 70 exits the MP at pole tip 14p at the ABS 30-30 and is used to write a plurality of bits on magnetic media 140. Write gap 16 and leading gap 13 contact top and bottom MP surfaces, respectively, at the ABS. Magnetic flux (return field) 70b returns to the MP through a trailing loop comprised of trailing shield 17, write shield (WS) 18 with front side 18f at the ABS, an uppermost (PP3) trailing shield (TS) 26a-26c connecting the WS to the top yoke, and top yoke (TY) 36. In the exemplary embodiment, the PP3 TS front portion 26a has a front side 26f at the ABS, but in other embodiments the front side may be recessed from the ABS. Center PP3 TS portion 26c connects the PP3 TS front portion to PP3 TS back portion 26b that contacts the TY top surface 36t behind the driving coil. TY front side 36f is typically below point 80 where a front side of PP3 TS back portion contacts the TY. The WS and TY are separated with dielectric layer 21, and each has a top surface at plane 45-45. Insulation layer 25 surrounds the driving coil and is formed on dielectric layer 21. Dielectric layer 40 adjoins TY backside 36e and a MP backside. A protection layer 27 covers the PP3 shield and is made of an insulating material such as alumina.

In the exemplary embodiment that features a non-double write shield (nDWS) scheme, there is a leading return loop for magnetic flux 70a that terminates at leading shield 11. In an alternative embodiment (not shown), there is a leading shield connector and S2 connector (S2C) in dielectric layer 38 between the ABS 30-30 and bucking coil 60a, a return path (RTP) in dielectric layer 10, and a back gap connection (BGC) formed between the RTP and bottom yoke 35 that provide a continuous magnetic connection for magnetic flux 70a to return to MP 14. The bottom yoke 35 is formed in dielectric layer 39, and has a tapered front side 35f and a backside 35e. Dielectric layers 10, 13, 16, 21, 25, 27, and 38-40 are employed as insulation layers around magnetic and electrical components.

Figure 5A:
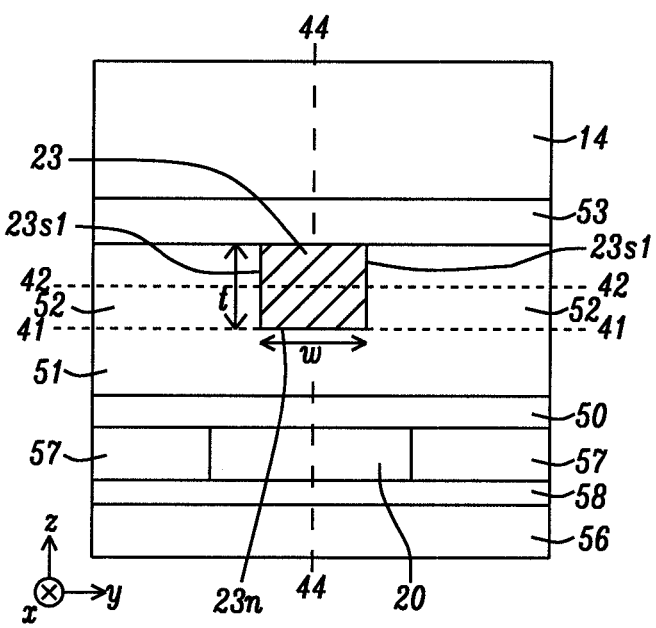
FIG. 5A is an ABS view of a TAMR head wherein a NFT (PG) is formed between a main pole and a waveguide, and where the upper Rh layer in the PG front portion (bilayer) has a substantially rectangular shape (peg) according to an embodiment of the present disclosure.

Referring to FIG. 5A, the exemplary embodiment of the present disclosure is shown from an ABS view. The PG has a front portion (bilayer) that has an upper layer 23 and lower layer 22a shown in the down-track cross-sectional view at center plane 44-44 in FIG. 5B. However, from the ABS view in FIG. 5A, only the front side of upper PG layer 23 is illustrated since the lower PG layer is recessed from the ABS, and is behind dielectric layer 51, which is formed on dielectric layer 50. The upper PG layer is preferably Rh, but may also be Au, Ag, Cu, Ir, Ru, Pt, Pd, or alloys thereof. The lower PG layer is preferably Au but may be Ag, Cu, Al, Co, Ni, or alloys thereof in other embodiments.

The PG is formed between MP 14 and waveguide (WG) 20, and the front (peg) portion of upper PG layer 23 has thickness t, and width w between sides 23s1 formed equidistant from center plane 44-44 that is orthogonal to the ABS. Note that only an upper portion of the WG is visible from this view while the lower portion is behind WG cladding layer 58, and behind dielectric layer 56 that is known as a blocker to prevent uncoupled WG modes from reaching the ABS and undesirably heating the magnetic medium. Plane 41-41 is orthogonal to both of the ABS and center plane, and comprises bottom surface 23n of the upper PG layer. Plane 42-42 is parallel to plane 41-41 and passes through a middle portion of the upper PG layer. Peg-pole spacer (PPS) 53 is a dielectric material that has a thickness from 5 nm to 30 nm and contacts a bottom surface of the MP and a top surface of the upper PG layer. Dielectric layer 52 adjoins upper PG layer sides 23s1. Dielectric layer 50 is formed on WG cladding layer 58. The WG is preferably a high index material such as TaOx while dielectric layers 50-53, and 56, and WG cladding layers 57, 58 are low index materials that are silicon oxide or aluminum oxide, for example.

Figure 5B:
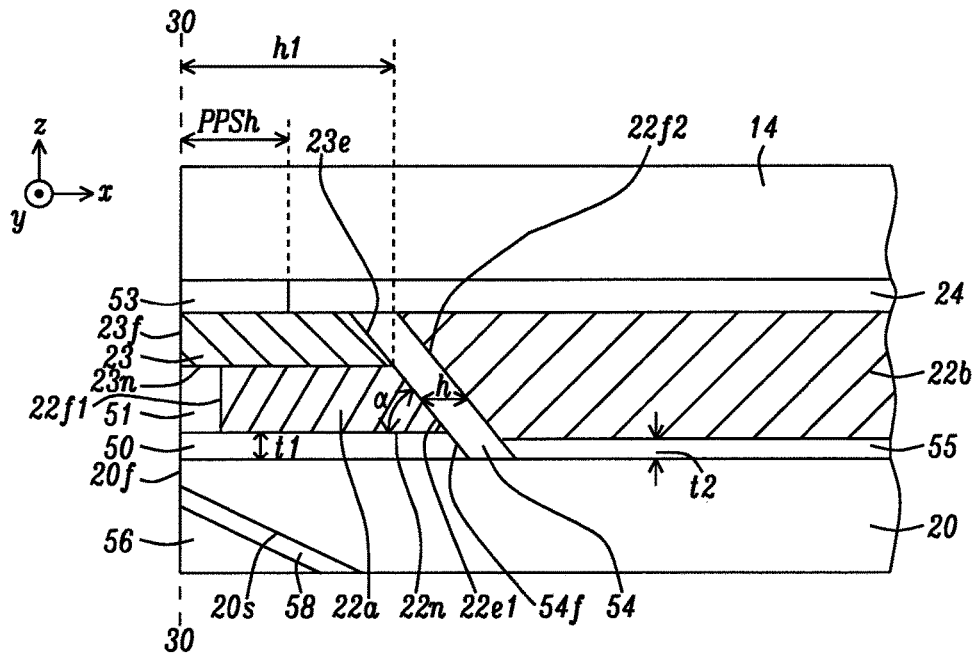
FIG. 5B is a down-track cross-sectional view of the TAMR head structure in FIG. 5A according to a first embodiment where a sloped dielectric separation (DS) layer adjoins a backside of the PG front portion and a front side of the PG back portion, and a diffusion barrier contacts a substantial portion of the PG top surface.

In FIG. 5B, a down-track cross-sectional view is illustrated at center plane 44-44 in FIG. 5A and depicts front side 23f of upper PG layer 23. Blocker 56 has decreasing thickness with increasing distance (height) from ABS 30-30, and is a metal or alloy such as Rh, TiN, Ru, NiFe, FeCo, or the like. In other embodiments, the blocker may be a laminated structure comprised of one or more of $Ta_2O_5$, alumina, or other dielectric materials. An optional dielectric layer 58 that serves as a front WG cladding layer may contact the WG tapered front side 20s, and adjoins the blocker backside. Dielectric layer 50 is formed on the WG and has thickness t1. Lower PG layer 22a has a front side 22f1 recessed from the ABS, and backside 22e1 forms an angle α with bottom surface 22n where α is 45±15 degrees. A key feature is that a dielectric separation (DS) layer 54 with height h of 10 nm to 30 nm in the x-axis direction, and made of a low index material, is used to separate lower PG layer 22a (and upper PG layer 23) from a PG back portion hereinafter called PG 22b that has front side 22f2. Thus, the front side of PG 22b is essentially parallel to the backside 22e1 of the lower PG layer and backside 23e of the upper PG layer. PG 22b is also made of one or more of Au, Ag, Cu, Al, Co, Ni, or alloys thereof. The slope of the DS layer is employed to provide efficient plasmon energy transfer from PG 22b to the PG front portion (22a/23 bilayer), and height h minimizes a temperature increase in the latter.

PG 22b is formed on dielectric layer 55 having thickness t2, which in turn contacts a top surface of WG 20 behind the DS layer. Preferably, t1 is greater than t2, and dielectric layer 50 has a larger effective refractive index (RI1) than the effective refractive index (RI2) of dielectric layer 55 to further promote efficient plasmon energy transfer from PG 22b to the PG front portion. The bottom end of upper PG layer backside 23e (and top end of lower PG layer backside 22e1) is a first height (h1) where h1>PPSh but is ≤350 nm from the ABS. Moreover, PPS 53 on the upper PG layer extends a second height (PPSh) from the ABS where PPSh is set at 100 nm±30 nm. It should be understood that if h1<PPSh, upper PG layer 23 and lower PG layer 22a cannot dissipate heat to MP 14. On the other hand, when h1>350 nm, the benefit of reducing total vacancies (and selective back end deformation) in the lower PG layer will be diminished as described in a later section. Diffusion barrier 24 is made of Ru, Rh, or Ir, contacts the PPS backside at height PPSh, and is formed on a top surface of PG 22b and on a portion of the upper PG layer at a height>PPSh. The diffusion barrier prevents the diffusion of metals between the MP and the PG front and back portions.

Those skilled in the art will appreciate that a heat sink (not shown) may be formed on diffusion barrier 24 and below MP 14 to provide a means of heat dissipation. Heat sinks are well known in the art and are preferably made of a high thermal conductivity material such as Ru, Rh, Ir, Au, or Cu. The heat sink compensates for MP heating caused by proximity of the MP to upper PG layer 23 and PG 22b and the elevated peg temperature during write processes, and may have a backside at a greater distance from ABS 30-30 than a backside (not shown) of PG 22b.

Figure 6A:
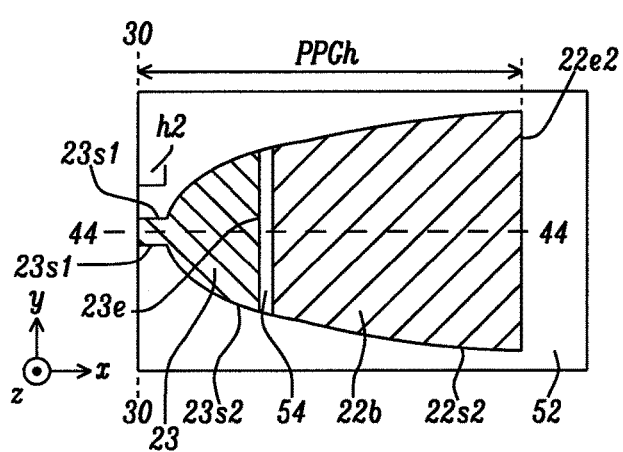
FIG. 6A is a top-down view of the PG at plane 42-42 in FIG. 5A and shows the upper Rh layer in the PG front portion has a peg shape up to height h2, and then there is a continuously curved sidewall on the PG front portion from h2 to the DS layer, and on the PG back portion behind the DS layer.

Referring to FIG. 6A, a top-down view of the PG is shown at plane 42-42 in FIG. 5A with overlying layers removed. Upper PG layer 23 has a front portion (peg) typically with a rod-like shape with sides 23s1 aligned orthogonal to ABS 30-30 and extending to height h2. A rear portion of the upper PG layer is bounded by curved sides 23s2 and has a backside 23e adjoining DS layer 54. Sides 23s2 are generally separated with increasing distance as the height from the ABS becomes greater. Behind the DS layer, PG 22b has sides 22s2 having greater separation in the cross-track direction with increasing distance from the DS layer until reaching backside 22e2, which is at a Planar Plasmon Guide height (PPGh) from the ABS.

Figure 6B:
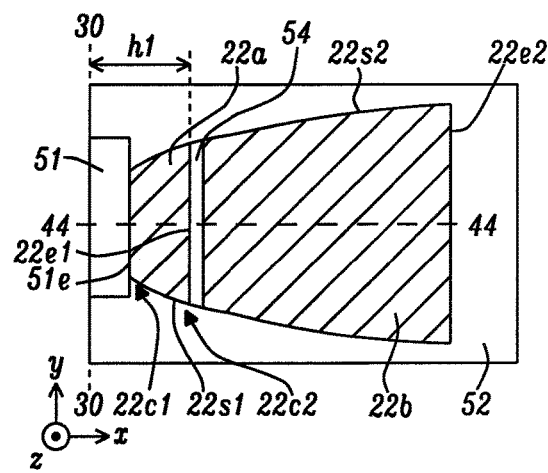
FIG. 6B is a top-down view of the PG at plane 41-41 in FIG. 5A and shows a dielectric layer between the ABS and a front side of the lower Au layer in the PG front portion and where the curved sides of the lower PG layer are separated with increasing cross-track width as the distance from the ABS becomes greater.

FIG. 6B is a top-down view of the PG at plane 41-41 in FIG. 5A with overlying layers removed. The same features for PG 22b are visible as in FIG. 6A. However, unlike upper PG layer 23, lower PG layer 22a is separated from the ABS 30-30 by dielectric layer 51. Sides 22s1 of the lower PG layer have essentially the same curvature and separation as upper PG layer sides 23s2 in FIG. 6A, and extend to a lower PG layer backside 22e1 having a top end at height h1. In other words, sides 23s2 in the back portion of the upper PG layer are self-aligned to the lower PG layer sides 22s1. Each lower PG layer curved side has a front section 22c1 that connects with dielectric layer backside 51e, and a back section 22c2 that contacts DS layer 54.

Figure 6C:
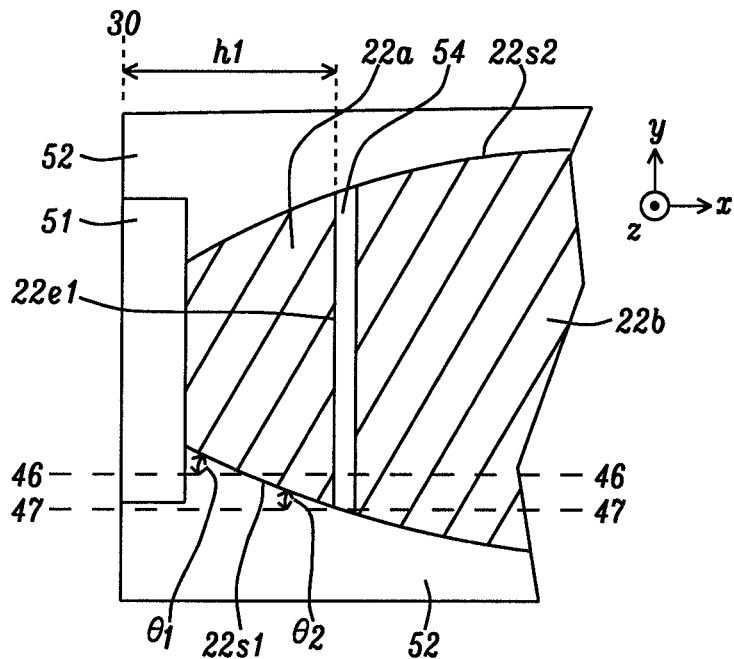
FIG. 6C is an enlargement of the lower Au layer in FIG. 6B and indicates that a front section of the lower Au layer curved side forms a larger angle with respect to a plane aligned orthogonal to the ABS than a rear section of said curved side.

FIG. 6C is an enlargement of the lower PG layer 22a in FIG. 6B and shows an important feature in that the front section 22c1 of curved side 22s1 (proximate to dielectric layer 51) forms a larger angle 91 with plane 46-46 than angle 82 formed by the back section 22c2 of side 22s1 (proximate to DS layer 54) with plane 47-47 where both of the aforementioned planes are parallel to center plane 44-44. Thus, the back section of the lower PG layer curved side has a sharper edge than a front section of the curved side. As described in a later section, this aspect will be critical in selectively deforming a rear portion of the lower PG layer during a subsequent heat treatment so that a front portion will be densified while voids are sequestered to the lower PG layer backside proximate to bottom surface 22n and the DS layer 54. Note that the lower PG layer bottom surface 22n forms a relatively sharp angle (substantially <90 degrees) with backside 22e in the down-track cross-sectional view in FIG. 5B that also favors selective deformation in the lower PG layer during a subsequent thermal treatment.

It should be understood that in alternative embodiments where the upper PG layer 23 is made of Au, the rear portion of the upper PG layer will also be deformed during a heat treatment since sides 23s2 overlay on lower PG layer sides 22s1 and therefore the rear section of the upper PG layer curved side 23s2 that forms angle 92 with plane 47-47 has sharper edges than a front section that forms angle θ1 with plane 46-46. As a result, void formation will be concentrated at backside 23e while a front of the upper PG layer including the peg at the ABS will be densified to provide improved performance over the prior art.

Figure 7:
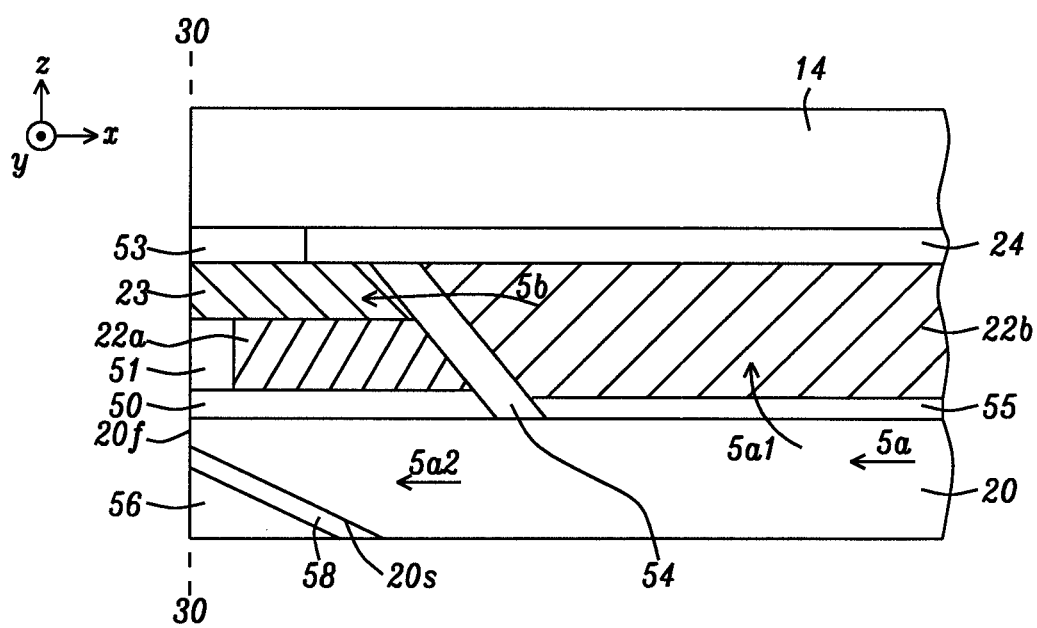
FIG. 7 is a down-track cross-sectional view of the TAMR head of the first embodiment that shows light from a laser diode is transmitted through a waveguide and a portion is coupled into a PG back portion, and generates plasmon energy which propagates through the PG front portion to the ABS.

Referring to FIG. 7, light 5a is generated by a laser diode (not shown) mounted on the back end of the slider on which the TAMR head is formed, and is propagated toward the ABS within WG 20. A substantial portion of light 5a1 is coupled to PG 22b in the form of a plasmonic resonance or surface plasmon mode 5b that continues to lower PG layer 22a and upper PG layer 23, and finally to the peg portion of the upper PG layer before coupling to a heating spot on a magnetic medium (not shown) proximate to the ABS 30-30 thereby facilitating a write process involving a magnetic bit proximate to the heating spot. The remaining WG light 5a2 is not coupled to the PG and continues to propagate toward the ABS within the WG. As mentioned earlier, blocker 56 is advantageously employed to reflect a significant portion of light 5a2 to minimize the intensity of uncoupled light from exiting WG front side 20f and undesirably heating portions of the magnetic medium outside the bit that is to be switched.

Figure 8A:
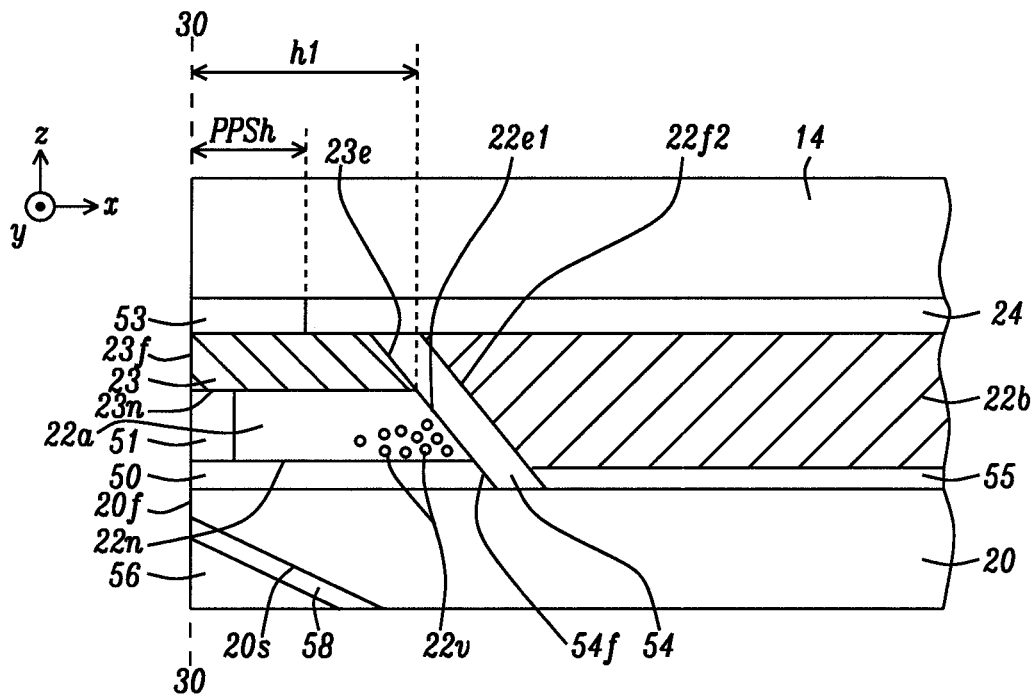
FIG. 8A is a down-track cross-sectional view that shows vacancies preferentially form proximate to the backend of the lower Au layer during a thermal stress treatment in the fabrication process since the rear edge of the lower Au layer has a sharper (smaller) angle than the front edge as indicated in FIG. 6C.
Figure 8B:
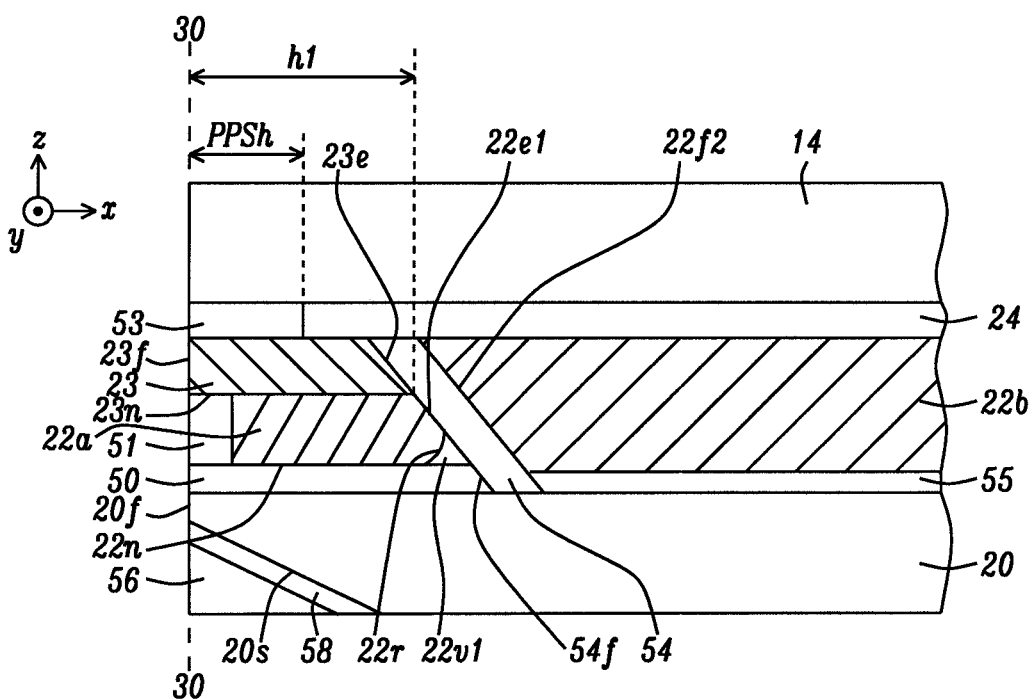
FIG. 8B is a down-track cross-sectional view that shows sacrificial deformation at the backend of the lower Au layer as a result of the thermal stress treatment in FIG. 8A so that a void is generated adjacent to the DS layer according to an embodiment of the present disclosure.

FIGS. 8A-8B schematically show the deformation of the lower Au layer in the PG front portion as a result of thermal stress during a plurality of write operations in HDD. However, it is also possible to generate said Au deformation during the write head fabrication process at the wafer level, and prior to incorporation in a HDD. For example, a laser annealing technique described by K. Shimazawa et al. in U.S. Pat. No. 10,020,193 may be employed and thereby selectively apply thermal stress only proximate to the surface of a wafer (including upper and lower PG layers in the PG front portion) to cause Au, for example, in the lower PG layer to deform. FIG. 8A indicates that during the initial stage of the laser treatment, vacancies 22v migrate toward backside 22e1 in lower Au layer 22a, and accumulate proximate to DS layer front side 54f. After the laser annealing is completed as shown in FIG. 8B, the vacancies form a void 22v1 at the back end of the Au layer where backside 22e1 intersects with Au bottom surface 22n. The lower Au layer now has a rounded backside 22r. A similar laser annealing was previously described in Ser. No. 16/800,049 to produce a void in a bottom portion of a gold peg at the ABS while densifying an upper portion thereof to improve ADC performance.

Figure 8C:
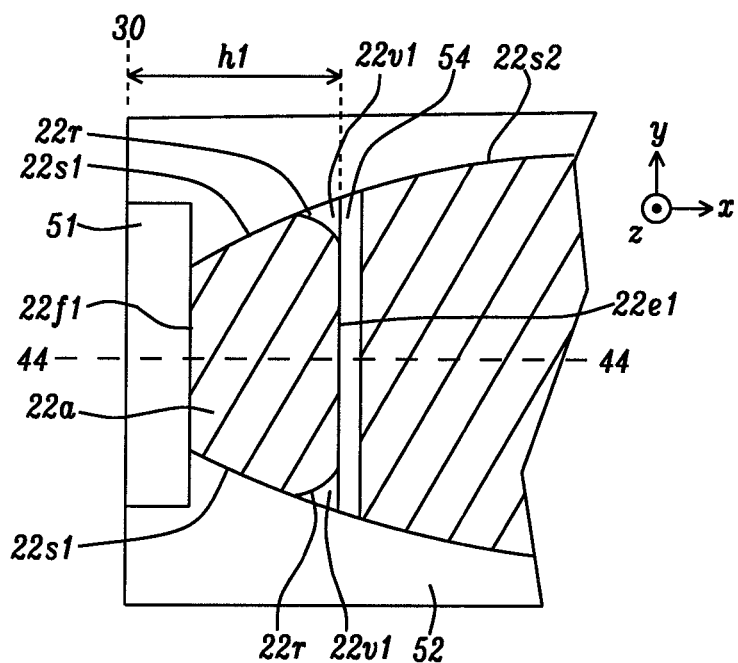
FIG. 8C is a top-down view depicting the deformation at the rear end of the lower Au layer in FIG. 8B as a result of the thermal stress treatment.

FIG. 8C is a replica of a transmission electron microscope (TEM) image that depicts a top-down view of the lower Au layer following a laser annealing process. Note that a void 22v1 is found on each side of center plane 44-44 proximate to a sharp edge described earlier (FIG. 6C) where a back section of side 22s1 forms angle θ2 with plane 47-47. Before the annealing process, the lower Au layer 22a has a multi-grain structure with a plurality of vacancies located at grain boundaries across the layer. The thermal stress during laser annealing causes the vacancies to concentrate in the sharp edged rear portions of the lower Au layer and generate substantial deformation (voids). However, grain boundaries in the lower Au layer have disappeared and density therein has improved significantly, especially in a front portion proximate to front side 22f1. When the laser annealing is implemented in the PG fabrication process at the wafer level, an important benefit is realized in the suppression of deformation in the front portion of the lower Au layer, which is important as a heat sink for the PG.

Obviously, if the number of vacancies contained in a unit volume (i.e. lower Au layer) is constant, the total number of vacancies decreases as the volume decreases, and the volume shrinkage is also reduced when heat stress is applied. However, when the Planar Plasmon Guide height (PPGh) and h1 are shortened to reduce the PG 22b and lower Au layer 22a volume, respectively, ADC performance will degrade substantially. A simulation was performed to compare various key performance parameters of an embodiment of the present disclosure with a TAMR device (Process of Record=POR) in related U.S. Pat. No. 10,262,683 where the PG has a self-aligned Au/Rh bilayer structure. The results are shown in Table 1 below. Peg width (w in FIG. 5A) is 28 nm, while the thickness t is 35 nm, and height (h2 in FIG. 6A)=20 nm. Angle α=45 degrees and the laser light source provides a wavelength of 808 nm. PPSh is set at 100 nm.

TABLE 1

Performance comparison of PG (NFT) designs in a TAMR head

| | PPGh (um) | Front Au height h2 (um) | DT thermal gradient (° K/nm) | CT thermal gradient (° K/nm) | Req. power (mW) | PG temp. (° C.) |
|---|---|---|---|---|---|---|
| POR Ex. 1 | 1.0 | — | 7.6 | 8.0 | 6.9 | 207 |
| POR Ex. 2 | 0.25 | — | 7.1 | 6.8 | 7.6 | 226 |
| Emb. 1 | 1.0 | 0.25 | 7.5 | 7.9 | 6.4 | 191 |

Table 1 shows that Embodiment 1 has significant advantages over the POR Example 2 where PPGh is 0.25 micron. Required power is the laser input power required to give the magnetic medium a temperature rise of 450° C. In the POR Example 2, it is understood that shortening PPGh degrades the coupling efficiency from the waveguide to PG. Because of this decreased coupling efficiency, the peg temperature rises and the thermal gradient degrades.

Embodiment 1 and POR Example 1 have substantially the same thermal gradient, but Embodiment 1 has a higher efficiency of plasmon propagation since the rear portion of the PG (PG 22b) is comprised only of Au compared with a Au/Rh bilayer in the POR design. Even if the thermal gradient performance is the same in the aforementioned designs, the superiority of Embodiment 1 in terms of lower peg temperature means improved reliability. This benefit is realized because the back end of the lower Au layer (PG 22a) is sacrificially deformed during thermal stress while the front end of the lower Au layer in the POR bilayer scheme will suffer as a result of Au deformation in the front of said layer proximate to the ABS. In other words, densification of a front portion of lower Au layer 22a as mentioned previously provides a stable heat sink effect for the PG of the present disclosure.

The present disclosure also encompasses a method of the forming the TAMR device with the PG disclosed in one of the aforementioned embodiments. Referring to FIG. 9A (ABS view), FIG. 9B (down-track cross-section), and FIG. 9C (top-down) view, the process begins at a point where a substrate comprised of waveguide (WG) 20 with a top portion 20a and bottom portion 20b, cladding layer 57 on each side of the WG, front WG cladding layer 58, and blocker 56 in front of the bottom WG portion are provided according to well-known methods that are not described herein. The bottom WG portion has sloped front side 20s that is parallel with the blocker top surface. The blocker has decreasing thickness with increasing distance from the eventual ABS (plane 30-30). WG cladding layer 58 is preferably used as a spacer between the blocker and front WG side 20s.

Typically, a chemical mechanical polish (CMP) step is used to generate a planar top surface on the upper portion of WG 20. First dielectric layer 50 and second dielectric layer 51 are sequentially deposited on the substrate including WG 20 and cladding layer 57. FIG. 9B is taken at center plane 44-44 described earlier with regard to FIG. 6A. In one preferred embodiment, the first dielectric layer is alumina that is deposited with an atomic layer deposition (ALD) method to provide a more uniform layer than other deposition methods, and dielectric layer 51 is $SiO_2$. Note that the eventual ABS will be formed at plane 30-30 but not until the entire combined read-write head is completed and a back end lapping process is performed.

A photoresist layer is coated on dielectric layer 51 and is patternwise exposed and developed using conventional methods to form a photoresist mask having a front portion 81a at plane 30-30, and with backside 81e, and a back portion 81b with a front side 81f facing plane 30-30 thereby forming opening 90 that exposes dielectric layer top surface 51t. From the top-down view in FIG. 9C, middle portions 81c of the photoresist mask connect front portion 81a with back portion 81b, and have inner sides 81s to yield a rectangular opening above dielectric layer 51.

Referring to FIGS. 10A-10C, a first photolithography process is performed wherein opening 90 is transferred through dielectric layer 51 and stops on dielectric layer 50. In particular, an ion beam etch (IBE) or reactive ion etch (RIE) process is used to remove portions of dielectric layer 51 that are not protected by the photoresist mask 81a-81c. Thereafter, lower PG layer 22 is deposited in the opening, and a chemical mechanical polish (CMP) step may be performed to remove the photoresist mask and lower PG layer field regions outside the boundary defined by front side 22f1, backside 22e, and sides 22s. As a result, PG top surface 22t is coplanar with dielectric layer top surface 51t. In some embodiments, an adhesion layer (not shown) made of Zr or SmOx is deposited in the opening prior to the lower PG layer deposition. As mentioned previously, the lower PG layer may be one or more of Au, Ag, Cu, Al, Co, Ni, or alloys thereof. Note that backside 81e and front side 81f in the photoresist mask (FIG. 9C) determine the position of lower PG layer 22f1 front side and backside 22e, respectively, in FIGS. 10B-10C.

In the following steps depicted in FIGS. 11A-11C, upper PG layer 23 is deposited on dielectric layer 51 and on lower PG layer 22. Then another photoresist mask (not shown) is formed on the upper PG layer and an angled IBE is employed to generate tapered and coplanar backsides 23e and 22e1 on the upper PG layer and lower PG layer, respectively. Hereinafter, the lower PG layer is identified as 22a rather than 22. The etch process also forms backside 50e on dielectric layer 50 and stops on WG top surface 20t and on side cladding layer 57. A key feature is that backside 22e1 forms angle α of 30-60 degrees with respect to dielectric layer bottom surface 50b (and lower PG layer bottom surface 22n).

Referring to FIG. 12A-12C, dielectric separation (DS) layer 54 is deposited on upper PG layer 23, lower PG layer backside 22e1, dielectric layer backside 50e, and on exposed portions of WG 20 and cladding layer 57. According to one embodiment, a third etch mask 82 comprised of a patterned photoresist layer is formed on a top surface of the upper PG layer using a conventional technique. Backside 82e of the third etch mask is preferably aligned above upper PG backside 23e. An IBE is performed such that ion beams 120 are directed substantially parallel to upper PG layer and lower PG layer backsides 23e, 22e1, respectively, to selectively thin a portion of the DS layer 54 above WG 20 thereby defining dielectric layer 55 with thickness t2. Meanwhile, the thickness h of the DS separation layer on backsides 23e, 22e1 is maintained from 10 nm to 30 nm.

Referring to FIGS. 13A-13C, the third etch mask is stripped after the etching process, and then PG layer 22x is deposited on DS layer 54 and dielectric layer 55. A fourth photoresist mask (not shown) is formed on PG layer 22x, and an etch process is used to define backside 22e2 on PG layer 22x thereby exposing a portion of dielectric layer 55. Thereafter, the fourth photoresist mask is stripped.

Referring to FIGS. 14A-14C, a dielectric layer 52 such as $SiO_2$ is deposited on dielectric layer 55 behind PG layer backside 22e2 using a plasma enhanced chemical vapor deposition (PECVD) step, for example. Next, a CMP process may be used to planarize the partially formed NFT and yield top surface 23t on upper PG layer 23 that is coplanar with top surface 22t on PG layer 22x and dielectric layer top surface 52t.

In FIGS. 15A-15C, a fifth photoresist layer is coated, patternwise exposed, and developed on upper PG layer 23 and PG 22b to form a fifth etch mask 83 and will be used to define the desired PG shape. From the ABS view in FIG. 15A, the front portion of the etch mask has sides 83s. The down-track cross-sectional view at the center plane in FIG. 15B shows backside 83e, and a portion of dielectric layer top surface 52t is uncovered. The top-down view in FIG. 15C illustrates mask sides 83s1 in front of DS layer 54, and mask sides 83s2 behind the DS layer that will determine sides 23s2 and 22s2 on the upper PG layer and PG 22b, respectively, after a subsequent etch step.

Referring to FIGS. 16A-16C, an IBE process is performed to remove regions of the front PG portion and PG 22b that are not protected by the fourth etch mask 83 thereby generating sides 23s1 on the front portion (peg) of the upper PG layer 23, sides 23s2 on a back portion of upper PG layer, sides 22s1 (not shown) on the lower PG layer, and sides 22s2 on PG 22b. Then, the fifth etch mask is stripped.

FIGS. 17A-17C depict the next step in the fabrication sequence where dielectric layer 52 is deposited with a plasma enhanced chemical vapor deposition (PECVD) and then a CMP process is employed to generate top surface 23t1 on upper PG layer 23 and top surface 22t1 on PG 22b that are coplanar with dielectric layer top surface 52t1. The thickness of the PG front portion and PG 22b is preferably from 20 nm to 50 nm.

Referring to FIGS. 18A-18C, PPS 53 comprised of $SiO_2$, for example, is deposited on upper PG layer 23, PG 22b, and on dielectric layer 52. Thereafter, a sixth photoresist layer is coated on the PPS, patternwise exposed, and developed to form a sixth etch mask (not shown) above a front portion of the PPS. A backside of the sixth etch mask defines PP3 backside 53e and height PPSh after an IBE or RIE process is performed to remove unprotected regions of the PPS. Next, diffusion barrier 24 is deposited in the opening generated from the etching step and adjoins the PPS backside. The sixth etch mask is then stripped.

The remaining steps in the fabrication sequence to complete the write head including deposition of the MP on PPS 53 and on the diffusion barrier 24 are well known in the art and are not described herein. A final step is to perform a lapping process that forms the ABS at plane 30-30. It should be understood that in embodiments where a laser annealing process is performed at the wafer level to deform a back end of the lower PG layer 22a, the laser annealing step may occur anytime before the lapping process.

While this disclosure has been particularly shown and described with reference to, the preferred embodiments thereof, it will be understood by those skilled in the art that various changes in form and details may be made without departing from the spirit and scope of this disclosure.

We claim:

1. A thermally assisted magnetic recording (TAMR) device, comprising:
    (a) a main pole (MP) that generates a magnetic field to switch a magnetization in one or more bits in a magnetic medium;
    (b) a waveguide (WG) that provides light to a near field transducer (NFT); and
    (c) the NFT formed between the WG and MP and that serves as a plasmon generator (PG); the PG comprises:
        (1) a PG front portion with a tapered backside and a bilayer configuration, comprising:
            an upper metal layer with a front portion having a rod-like shape (peg) with a front side at the ABS and two sides aligned orthogonal to the ABS, and a back portion with a bottom surface intersecting the PG front portion tapered backside at a first height (h1) from the ABS that is greater than a height of a top end of the PG tapered backside; and
            a lower metal layer with a front side that is recessed from the ABS, a bottom surface that forms an angle α with the tapered backside of the PG front portion, and having two curved sides each with a back section that forms a smaller angle with respect to a plane aligned orthogonal to the ABS than a front section of each curved side; and
        (2) a PG back portion having a front side aligned essentially parallel to the tapered backside of the PG front portion and separated therefrom with a first dielectric layer having a height (h), and wherein the PG back portion has two sides separated by increasing width with increasing distance from the first dielectric layer and terminating at a backside that is parallel to the ABS;
    (d) a second dielectric layer formed on the WG and contacting a bottom surface of the lower metal layer in the PG front portion; and
    (e) a third dielectric layer on the WG and contacting the bottom surface of the PG back portion.

2. The TAMR device of claim 1 further comprising a dielectric spacer (PPS) between the PG front portion and MP and having a dielectric constant less than that of the WG, and wherein the PPS extends from the ABS to a second height (PPSh).

3. The TAMR device of claim 2 further comprising a diffusion barrier that adjoins a backside of the PPS and prevents metal diffusion between the MP and PG.

4. The TAMR device of claim 1 wherein the first dielectric layer is AlOx or $SiO_2$ and has a refractive index less than that of the WG.

5. The TAMR device of claim 2 wherein h1>PPSh, and the first height (h1) is from 60 nm to 350 nm.

6. The TAMR device of claim 2 wherein the lower metal layer in the PG front portion, and the back PG portion are comprised of Au, Ag, Cu, Al, Co, Ni, or alloys thereof.

7. The TAMR device of claim 2 wherein the height (h) is from 10 nm to 30 nm.

8. The TAMR device of claim 2 wherein the angle α is 45±15 degrees.

9. The TAMR device of claim 1 wherein the upper metal layer in the front PG portion is Rh, Au, Ag, Cu, Ir, Ru, Pt, Pd, or alloys thereof.

10. The TAMR device of claim 1 further comprised of a fourth dielectric layer formed between the ABS and a tapered front side of a bottom portion of the WG, and that serves as a blocker to prevent uncoupled light in the bottom WG portion from reaching the ABS.

11. The TAMR device of claim 1 wherein the second dielectric layer has a thickness t1 and a first refractive index (RI1), and the third dielectric layer has a thickness t2 and a second refractive index (RI2) where t1>t2, and RI1>RI2.

12. A head gimbal assembly (HGA), comprising:
    (a) the TAMR device of claim 1; and
    (b) a suspension that elastically supports the TAMR device, wherein the suspension has a flexure to which the TAMR device is joined, a load beam with one end connected to the flexure, and a base plate connected to the other end of the load beam.

13. A magnetic recording apparatus, comprising:
    (a) the HGA of claim 12;
    (b) a magnetic recording medium positioned opposite to a slider on which the magnetic read head structure is formed;
    (c) a spindle motor that rotates and drives the magnetic recording medium; and
    (d) a device that supports the slider, and that positions the slider relative to the magnetic recording medium.

* * * * *